Jan. 14, 1930. J. S. SURBAUGH 1,743,250
SHOVEL
Filed April 30, 1928
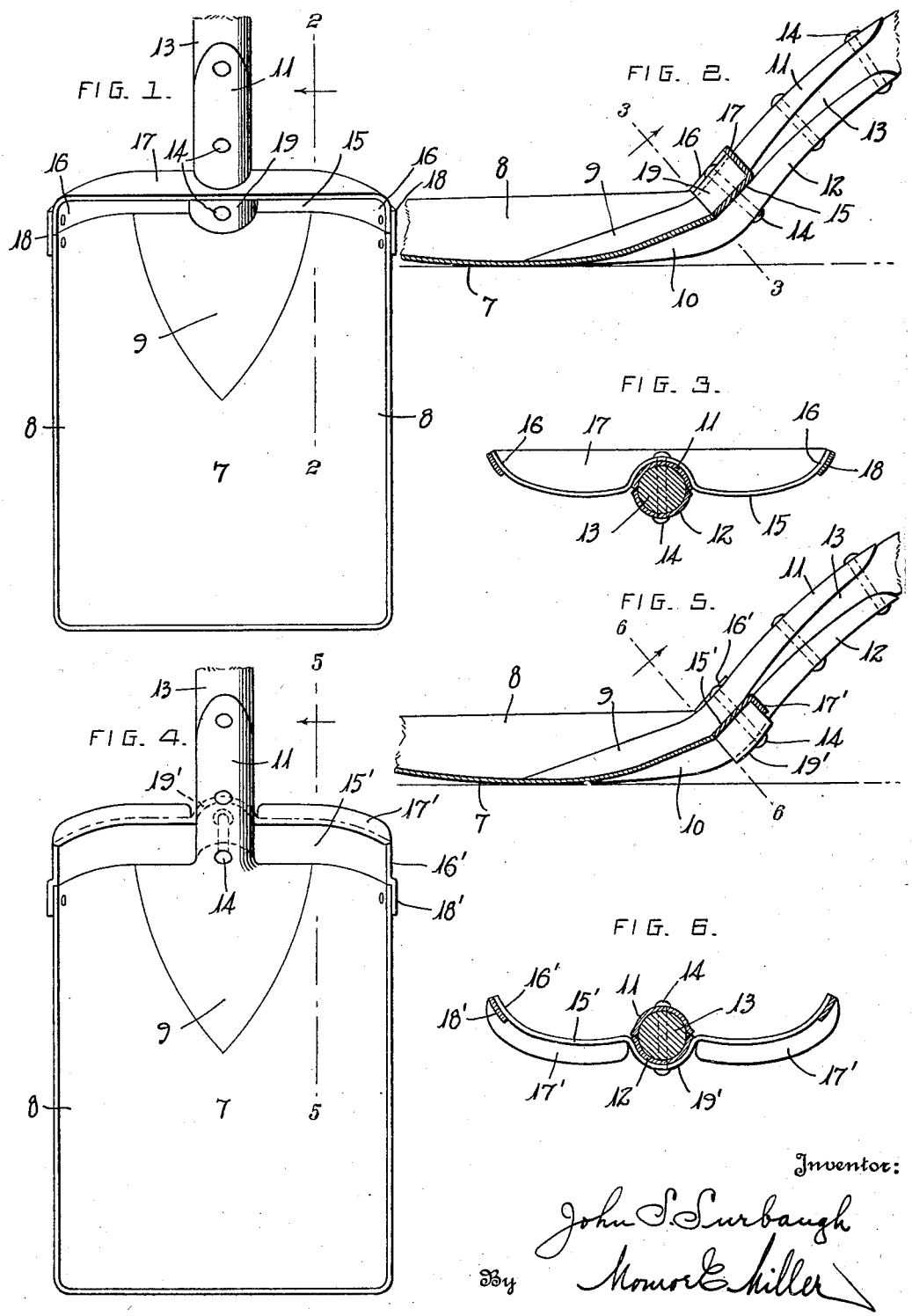

Patented Jan. 14, 1930

1,743,250

UNITED STATES PATENT OFFICE

JOHN S. SURBAUGH, OF VINCENNES, INDIANA; CALLIE E. SURBAUGH EXECUTRIX OF SAID JOHN S. SURBAUGH, DECEASED

SHOVEL

Application filed April 30, 1928. Serial No. 274,119.

The present invention relates to shovels, scoops, and similar implements, which are designated generally herein as "shovels," and the primary object of the invention is the provision of an attachment for a shovel which will increase the capacity of the shovel as well as providing a footrest.

Another object of the invention is the provision of a simple and inexpensive attachment for a shovel, for the purposes indicated, in order that the advantages sought may be gained without troublesome or complicated formation of the shovel blade itself, the attachment being readily applied to a shovel blade of conventional form, and being replaceable when worn out or broken.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a plan view of a shovel with one form of attachment applied thereto, the handle of the shovel being broken away.

Fig. 2 is a section on the line 2—2 of Fig. 1.

Fig. 3 is a section on the line 3—3 of Fig. 2.

Fig. 4 is a plan view of a shovel with another type of attachment applied.

Fig. 5 is a section on the line 5—5 of Fig. 4.

Fig. 6 is a section on the line 6—6 of Fig. 5.

A conventional type of shovel is illustrated which is of the "plain back" formation. The blade 7 has the upturned sides 8, and a piece or "spear head" 9 is welded on the upper surface of the blade over a downpressed roll 10 of the blade. The piece 9 is arched transversely, as usual, and the piece 9 and roll 10 are extended rearwardly into the transversely curved straps 11 and 12, respectively, between which the wooden handle 13 is secured by means of rivets 14 or other securing elements engaging through said straps and handle. As shown, the blade 7 is rectangular, but it may be of other shapes, with either a square, pointed or rounded nose.

The attachment comprises the extension 15 for the rear end of the blade 7, and pressed from suitable sheet metal. The attachment or extension 15 has the upturned sides 16 conforming to the sides 8 of the blade, and, as seen in Figs. 1, 2 and 3, the member 15 has the upwardly extending flange 17 extending along its rear edge. The flange 17, as shown, is substantially at right angles with the member 15, although the flange may be at different angles. The front edge of the member 15 extends along and registers with the rear end of the blade 7 substantially flush with said blade, and joint pieces 16 are riveted, welded or otherwise secured to the sides 8 and 16 of the blade and attachment, to secure the parts together.

The member 15 has an upwardly pressed or arched portion 19 to extend over the strap 11 and handle 13 of the shovel, and the portion 19 has an aperture to receive the corresponding rivet or securing element 14, thereby securing the intermediate portion of the attachment firmly to the shovel.

The attachment serves as an extension for the rear end of the blade, to increase the capacity of the shovel, and the flange 17 also serves as a footrest.

As shown, the flange 17 extends across the handle, but if desired, the flange may be of less height so as to consist of two parts having their inner ends terminating in the portion or roll 19.

As shown in Figs. 4, 5 and 6 the extension member 15' has its sides 16' provided with offset tongues 18' overlapping and rivetted, welded or otherwise secured to the sides 8 of the blade, so that either the separate pieces 18 above described or the integral tongues 18' may be used to fasten the extension to the shovel blade.

The member 15' has downturned flanges 17' at its rear end, to serve as footrests, and the inner ends of the flanges 17' terminate close to the handle. The member 15' has a downpressed portion 19' extending under the strap 12 and handle, and engaged by the corresponding rivet 14, although the portion 19' may extend over the handle the same as the portion 19 above described.

With the member 15' it is possible to readily clean and polish the upper surface of the blade, the flanges 17' being bent downwardly so as not to obstruct the cleaning or polishing of the rear end portion of the blade.

Although the adjacent edges of the blade 7 and attachment are shown as abutting or fitting together, it will be understood that in manufacturing the implements it is possible that said edges may be out of contact at points between the side edges of the blade, due to tolerance or inaccuracies in manufacture, so that the claims are not intended to limit the invention to the contact or snug fit of the blade and attachment throughout their adjacent edges.

Having thus described the invention, what is claimed as new is:—

1. A shovel attachment comprising an extension member of sheet metal formed to extend along the rear end of a shovel blade substantially flush with said blade.

2. A shovel attachment comprising an extension member of a shape to register with the rear end of a shovel blade substantially flush with said blade.

3. A shovel attachment comprising an extension member adapted to extend along the rear end of a shovel blade substantially flush with said blade and flanged at its rear edge.

4. A shovel attachment comprising an extension member adapted to extend along the rear end of a shovel blade substantially flush with said blade and having a curved portion to fit astride the shovel handle.

5. A shovel attachment comprising an extension member adapted to extend along the rear end of a shovel blade and having a curved portion to fit astride the shovel handle, and having a flange along its rear edge.

6. The combination with a shovel including a blade and a handle, of an extension member extending along the rear end of the blade substantially flush with said blade and secured thereto.

7. The combination with a shovel including a blade and a handle, of an extension member of a shape corresponding to and registering with the rear end of the blade and secured to said blade.

8. The combination with a shovel including a blade and a handle, of an extension member extending along and secured to the rear end of the blade, the rear edge of said member being flanged.

9. The combination with a shovel including a blade and a handle, of an extension member extending along and secured to the rear end of the blade and having a curved portion fitting astride the handle.

10. The combination with a shovel including a blade and a handle, of an extension member extending along and secured to the rear end of the blade, said member having a curved portion fitting astride the handle and having its rear edge flanged.

11. The combination with a shovel including a blade and a handle, of an extension member extending along and secured to the rear end of the blade and having a curved portion fitting astride and secured to the handle.

In testimony whereof I hereunto affix my signature.

JOHN S. SURBAUGH.